United States Patent [19]

Shah

[11] 4,117,306
[45] Sep. 26, 1978

[54] POUCH SEALING DEVICE

[75] Inventor: Jagdish Chandullal Shah, Stamford, Conn.

[73] Assignee: International Telephone & Telegraph Corp., Nutley, N.J.

[21] Appl. No.: 816,425

[22] Filed: Jul. 18, 1977

[51] Int. Cl.² ........................................... H05B 1/00
[52] U.S. Cl. .................................. 219/243; 156/515; 156/583
[58] Field of Search ................... 219/229, 243; 53/33; 156/515, 579, 583; 93/DIG. 1

[56] References Cited

U.S. PATENT DOCUMENTS

| 2,460,460 | 2/1949 | Langer | 219/243 X |
| 3,593,000 | 7/1971 | Forma | 219/243 |
| 3,614,383 | 10/1971 | Watts, Jr. | 219/243 |
| 3,943,323 | 3/1976 | Smith et al. | 219/229 X |

Primary Examiner—C. L. Albritton
Attorney, Agent, or Firm—John T. O'Halloran; Alfred C. Hill

[57] ABSTRACT

A sealing bar with longitudinal grooves on the surface produces a corduroy-like surface on the sealed edge of a plastic pouch to provide a means for visible detection of contamination in the seal.

1 Claim, 1 Drawing Figure

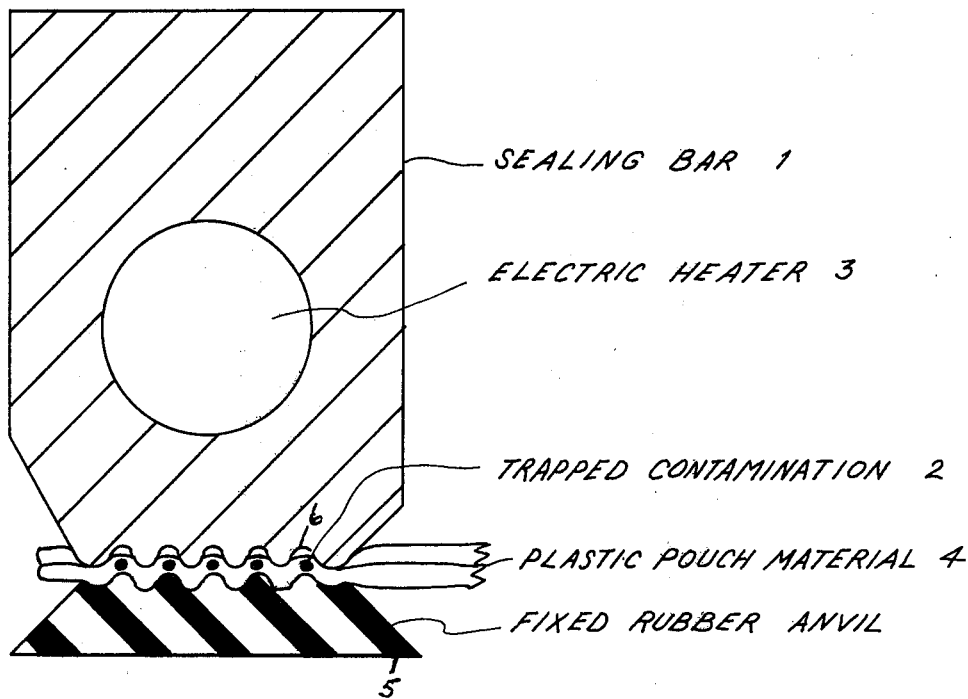

POUCH SEALING DEVICE

BACKGROUND OF THE INVENTION

This invention relates to the sealing of plastic pouches and more particularly to the sealing of plastic pouches to enable visible detection of contamination in the seal after a sealing process has been completed.

A new pouch of interest to ITT Continental Baking Company for their Flavor Seal Program has been purchased. This new pouch is of interest because it does not utilize any adhesive between pouch laminates. Extractants resulting from the adhesives have represented a stumbling block towards obtaining FDA approval for all previous pouch designs. Packaging test runs conducted with the new pouch of plastic material, however, revealed an inability to visually detect seal contamination after normal pouch sealing operations. The new pouch material which is of greater thickness than previously employed pouch material hides the normal signs (blisters and wrinkles) of contamination in the seal area after the sealing operation. Packaging tests were performed with the Flex-Vac Model 69 and Sentinel Model 12-AS sealing bars. The new pouches were intentionally contaminated with liquid (sauce) and solid (meat fiber and vegetable) food components. Pressure was applied with the above sealers using a heated flat bar to the top contaminated seal area. The contamination spread within the seal area creating cold spots as a result of the lack of heat transfer in the contaminated portion of the seal. The unsealed portion of the seal remained visually indistinguishable from properly sealed portions of the seal area. Seal contamination detection by visual inspections was therefore not possible using a seal operation that previously had provided for visual detection with previous pouch material. The only known non-destructive seal detecting technique is by using an infrared scanner which costs over $60,000, which is prohibitive.

SUMMARY OF THE INVENTION

An object of the present invention is to provide an improved sealing bar which will enable visual detection of contamination in the seal after a sealing process has been completed.

A sealing bar with longitudinal grooves on the surface produces a corduroy-like surface on the sealed edge of a plastic pouch to provide a means for visible detection of contamination in the seal.

BRIEF DESCRIPTION OF THE DRAWING

Above-mentioned and other features and objects of this invention will become more apparent by reference to the following description taken in conjunction with the accompanying drawing, in which the single FIGURE is a cross-sectional view of a sealing bar in accordance with the principles of the present invention.

DESCRIPTION OF THE PREFERRED EMBODIMENT

Modifications to the Flex-Vac sealing bar were made in an attempt to overcome the lack of visual seal contamination detection for the new pouch material. The Flex-Vac contains two metallic sealing bar units mounted side by side in two separate oscillating evacuation chambers. One metallic sealing bar was modified with longitudinal undulated grooves 6 0.060 inch × 0.015 inch deep along the entire sealing bar 1 length. The other bar was left without any modifications. Adjustments were made on both sealing bars to provide uniform pressure to the pouch to be sealed.

Several pouches made of the new material were filled with a product (chicken ala king) and were purposely contaminated in the top seal areas. The pouches were evacuated and sealed using both the original flat sealing bar and the new modified sealing bar 1 at a sealing bar temperature of 460° F. The pouches were then visually examined. The results of these tests are as follows:

(1) The pouches sealed with the modified sealing bar 1 had visible signals of trapped contaminations 2 in the form of blisters and wrinkles.

(2) Although the pouches were contaminated, three of four pouches sealed with the modified sealing bar 1 passed the pouch burst strength test with an internal pressure of 20 psi (pounds per square inch).

(3) There were no visible signs of contamination in the pouches sealed with the original flat bar.

(4) All the pouches sealed with the original flat bar failed when tested for pouch burst strength.

Sealing bar 1 includes therein an electric heater 3. The plastic pouch material 4 is placed on a substantially flat surface of a fixed rubber anvil 5. Then sealing bar 1 has pressure applied thereto, which along with the heat generated by electric heater 3 sealed the plastic pouch material 4 in the sealing area. The pressure of sealing bar 1 deforms the substantially flat surface of anvil 5 to assume the shape of grooves 6. The trapped contaminations 2 after the sealing process was visible, as mentioned above. When pressure is applied onto a pouch seal area using the grooved sealing bar 1, the liquid and solid food materials are displaced within the sealing bar grooves 6. Due to the large collection of particles in these grooves 6, wrinkles and blisters are visually detectable.

While I have described above the principles of my invention in connection with specific apparatus it is to be clearly understood that this description is made only by way of example and not as a limitation to the scope of my invention as set forth in the objects thereof and in the accompanying claims.

I claim:

1. A pouch sealing device comprising:
   a metallic pressure applying sealing bar having a sealing end with a plurality of longitudinal undulated grooves formed therein and spaced therealong to produce a corduroy-like surface on edges of a pouch to be sealed to enable visible detection of contamination in the seal after a sealing process has been completed;
   an electric heater means disposed in said sealing bar to heat said sealing end; and
   a fixed, stationary rubber anvil having a substantially flat surface upon which said edges of said pouch to be sealed is placed and said sealing bar is applied with pressure against said edges of said pouch to be sealed to the extent that said substantially flat surface of said rubber anvil is deformed to assume the shape of said undulated grooves.

* * * * *